United States Patent
Kanatsu

(10) Patent No.: US 6,628,832 B2
(45) Date of Patent: *Sep. 30, 2003

(54) TABLE RECOGNITION METHOD AND APPARATUS, AND STORAGE MEDIUM

(75) Inventor: Tomotoshi Kanatsu, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,208

(22) Filed: Sep. 8, 1999

(65) Prior Publication Data

US 2003/0123727 A1 Jul. 3, 2003

(30) Foreign Application Priority Data

Sep. 11, 1998 (JP) .......................................... 10-258681

(51) Int. Cl.[7] ................................................ G06K 9/34
(52) U.S. Cl. ........................ 382/173; 382/175; 382/180
(58) Field of Search ................................ 382/173, 175, 382/171, 176, 177, 178, 180, 199; 358/462, 453

(56) References Cited

U.S. PATENT DOCUMENTS 5,191,612 A * 3/1993 Katsuyama et al. ........ 382/180
5,668,892 A * 9/1997 Itonori ....................... 382/177
5,708,730 A * 1/1998 Itonori ....................... 382/177

* cited by examiner

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

The area and position of each cell in a table are analyzed on the basis of the layout state of ruled lines and character strings contained in the image of the table to obtain a table structure. The obtained table structure is displayed. When a user instructs to correct the area of a cell in the displayed table structure, the area and position of the cell are corrected on the basis of the correction instruction to obtain a corrected table structure. After correction of the table structure, characters in each cell of the corrected table structure are recognized, and table format data is generated and output on the basis of the recognition result and table structure.

14 Claims, 11 Drawing Sheets

FIG. 4

|   | X  | Y  | Z  |
|---|----|----|----|
| A | 31 | 8  | 34 |
| B | 10 | 20 | 2  |
| C | 12 | 9  | 11 |

FIG. 5

|   | X  | Y  | Z  |
|---|----|----|----|
| A | 31 | 8  | 34 |
| B | 10 | 20 | 2  |
| C | 12 | 9  | 11 |

|  | TYPE | NEW ARTICLE | USED ARTICLE |
|---|---|---|---|
| ERROR | A | 12.300 | 9.800 |
|  | B | 14.200 | 8.200 |
|  | C | 21.200 | 10.200 |
| CORRECT | A | 12.300 | 9.800 |
|  | B | 14.200 | 8.200 |
|  | C | 28.200 | 20.200 |

FIG. 10

|  | TYPE | NEW ARTICLE | USED ARTICLE |
|---|---|---|---|
| ERROR | A | 12.300 | 9.800 |
|  | B | 14.200 | 8.200 |
|  | C | 21.200 | 10.200 |
| CORRECT | A | 12.300 | 9.800 |
|  | B | 14.200 | 8.200 |
|  | C | 28.200 | 20.200 |

FIG. 11

|  | TYPE | NEW ARTICLE | USED ARTICLE |
|---|---|---|---|
| ERROR | A | 12.300 | 9.800 |
|  | B | 14.200 | 8.200 |
|  | C | 21.200 | 10.200 |
| CORRECT | A | 12.300 | 9.800 |
|  | B | 14.200 | 8.200 |
|  | C | 28.200 | 20.200 |

FIG. 12A
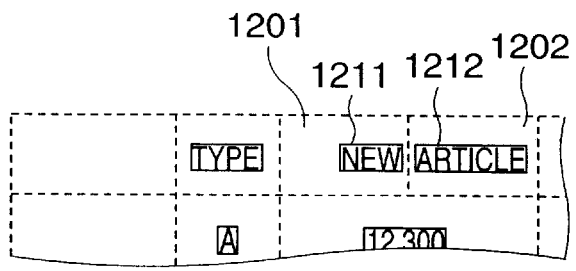
FIG. 12B
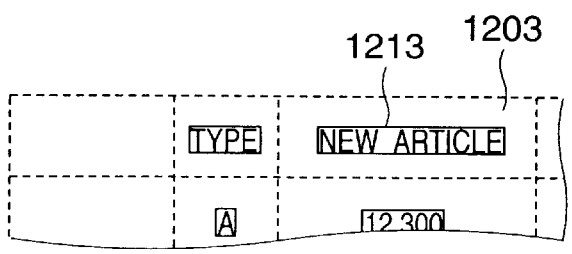
FIG. 13A
FIG. 13B

FIG. 15

```
<TABLE BORDER=1>
 <TR>
  <TD></TD><TD>TYPE</TD><TD>NEW ARTICLE</TD><TD>USED ARTICLE</TD>
 </TR>
 <TR>
  <TD ROWSPAN=3>ERROR</TD><TD>A</TD><TD>12,300</TD><TD>9,800</TD>
 </TR>
 <TR>
  <TD>B</TD><TD>14,200</TD><TD>8,200</TD>
 </TR>
 <TR>
  <TD>C</TD><TD>21,200</TD><TD>10,200</TD>
 </TR>
 <TR>
  <TD ROWSPAN=3>CORRECT</TD><TD>A</TD><TD>12,300</TD><TD>9,800</TD>
 </TR>
 <TR>
  <TD>B</TD><TD>14,200</TD><TD>8,200</TD>
 </TR>
 <TR>
  <TD>C</TD><TD>28,200</TD><TD>20,200</TD>
 </TR>
</TABLE>
```

TABLE RECOGNITION METHOD AND APPARATUS, AND STORAGE MEDIUM

BACKGROUND OF THE INVENTION

The present invention relates to a table recognition method and apparatus for converting a paper document having a table format into electronic table format data using OCR (Optical Character Recognition), and a storage medium.

Table recognition processing of converting a paper document having a table format into electronic data using OCR (Optical Character Recognition) makes it possible to form a database of information in a table on a paper sheet. This technology is important to widen the table utilization range.

Table recognition includes processing of analyzing the structure of a table and processing of recognizing characters in cells as elements of the table. A "table" has a two-dimensional structure consisting of a series of rows and columns of "cells" which have meaningful sets of characters and form elements of the table. From this viewpoint, table structure analysis is equivalent to an operation of obtaining the numbers of rows and columns of the table, the correspondences between characters in the table and the cells, and the correspondences between the cells and the matrix range of the table.

A general table recognition apparatus automatically analyzes the table structure, though the formats of tables to be recognized are limited. For example, only tables with easily detectable structures can be analyzed, including a table in which all cells are partitioned by ruled lines so the table structure can be readily obtained by only extracting the ruled lines, and a table in which ruled lines between the cells are not illustrated although cells are regularly laid out in a matrix and the structure can be easily estimated from the character layout.

However, tables take various layouts depending on the taste or intention of the user. Especially, when a table without ruled lines between cells has a mixture of cells across a plurality of rows and columns, blank cells, and a cell consisting of a plurality of rows, it is very difficult to always accurately obtain the structure from only the character layout. There are also examinations for realizing structure analysis close to the human thinking process by using models or taking the character recognition result into consideration. However, it may be impossible to always automatically analyze the structures of all tables.

A user of a table recognition apparatus corrects an automatically analyzed table structure as needed, thereby obtaining desired table data. The value of a table recognition apparatus greatly depends on the efficiency of the correction operation.

SUMMARY OF THE INVENTION

The present invention has been made in consideration of the above situation, and has as its object to provide an environment that allows easy correction of "cells" in a table structure obtained as the result of automatic analysis and efficient correction of the table structure.

It is another object of the present invention to provide an environment that allows more efficient correction of a table structure by real-time display of a change in the table structure based on correction by the user.

In order to achieve the above objects, according to an aspect of the present invention, a table recognition apparatus has the following arrangement.

There is provided a table recognition apparatus comprising: analysis means for analyzing an area and position of each cell in a table on the basis of a layout state of ruled lines and character strings contained in an image of the table to obtain a table structure; table structure display means for displaying the table structure obtained by the analysis means; instruction means for instructing to correct the area of the cell in the table structure displayed by the display means; correction means for correcting the area and position of the cell on the basis of a correction instruction by the instruction means to obtain a corrected table structure; and generation means for recognizing characters in each cell of the corrected table structure and generating table format data on the basis of a recognition result and the table structure.

In order to achieve the above objects, according to another aspect of the present invention, a table recognition method has the following steps.

There is provided a table recognition method comprising: a code for the analysis step of analyzing an area and position of each cell in the table on the basis of a layout state of ruled lines and character strings contained in an image of the table to obtain a table structure; a code for the table structure display step of displaying the table structure obtained in the analysis step; a code for the instruction step of instructing to correct the area of the cell in the table structure displayed in the display step; a code for the correction step of correcting the area and position of the cell on the basis of a correction instruction in the instruction step to obtain a corrected table structure; and a code for the generation step of recognizing characters in each cell of the corrected table structure and generating the table format data on the basis of a recognition result and the table structure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing an example of a table image;

FIG. 5 is a view showing a character string extraction result corresponding to the table image shown in FIG. 4;

FIG. 6 is a view showing a state wherein column boundary position candidates are extracted in association with the character string extraction result shown in FIG. 5;

FIG. 7 is a view showing the detection result of column and row boundaries;

FIG. 8 is a view showing an example of a boundary line display result;

FIG. 9 is a view showing another example of a table image;

FIG. 10 is a view showing an example of display of an analysis result when cells of the table image shown in FIG. 9 are accurately recognized;

FIG. 11 is a view showing an example of display of an analysis result when the table structure of the table image shown in FIG. 9 is misanalyzed;

FIGS. 12A and 12B are views for explaining to merge cells as an example of table structure correction;

FIGS. 13A and 13B are views for explaining to split cells as another example of table structure correction;

FIG. 15 is a view showing an output example of table format data corresponding to the table shown in FIG. 9.

DETAILED DESCRIPTION OF THE PREFERRED EMBODIMENTS

Preferred embodiments of the present invention will now be described in detail in accordance with the accompanying drawings.

Figure 1:
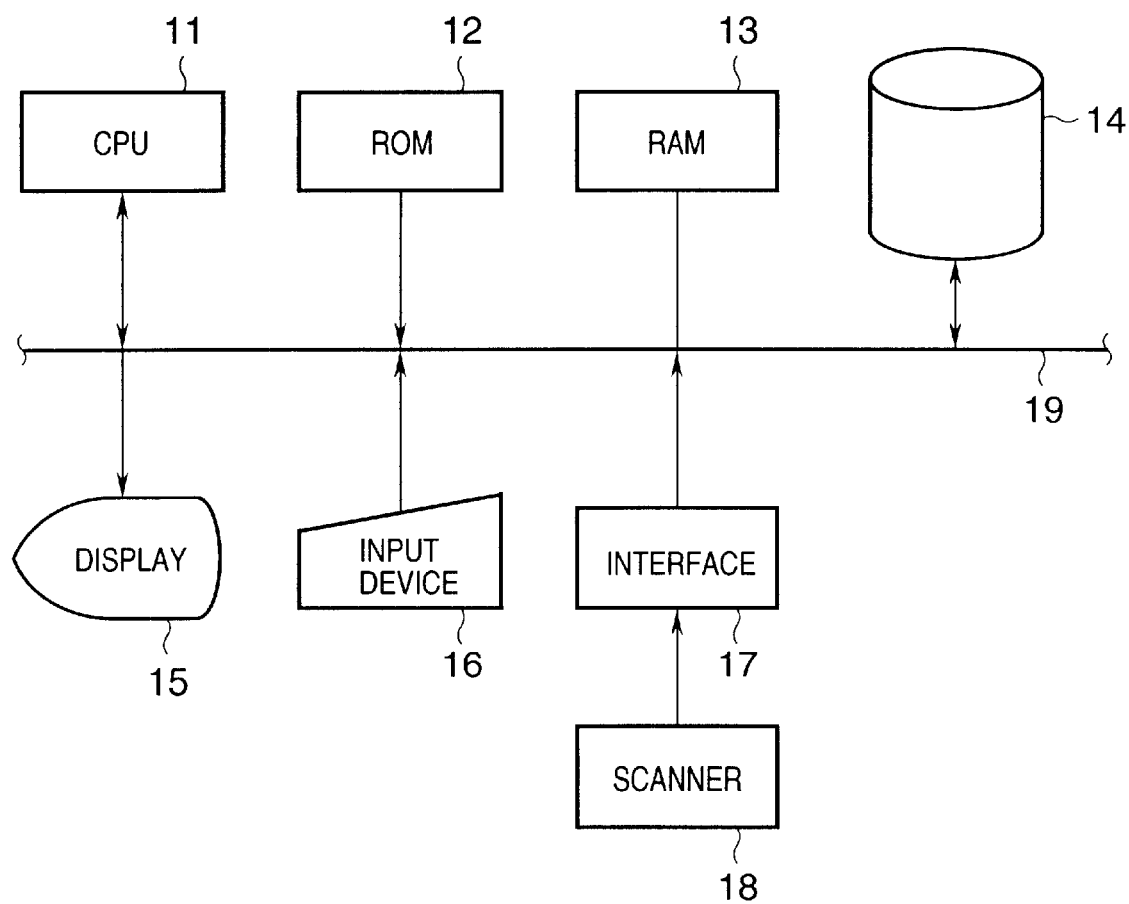
FIG. 1 is a block diagram showing the schematic arrangement of a table recognition apparatus according to an embodiment.

FIG. 1 is a block diagram showing the schematic arrangement of a table recognition apparatus according to an embodiment. This embodiment will exemplify a table recognition apparatus using a personal computer.

As shown in FIG. 1, a CPU 11 realizes various control operations in this apparatus in accordance with control programs stored in a ROM 12 or a RAM 13. The ROM 12 stores a boot program for activating the apparatus and various data. The RAM 13 provides an area for storing the control program to be executed by the CPU 11 or a work area for the CPU 11 to execute various control operations. An external storage device 14 is constructed by a hard disk or floppy disk. A control program stored in the external storage device 14 is loaded into the RAM 13 as needed and executed by the CPU 11.

A display 15 performs various display operations under the control of the CPU 11. An input device 16 comprises a keyboard and a pointing device such as a mouse (to be referred to as a mouse hereinafter). An interface 17 for a peripheral device is connected to a scanner 18 for reading an image in this embodiment. A bus 19 connects the above components to allow communication therebetween.

Figure 2:
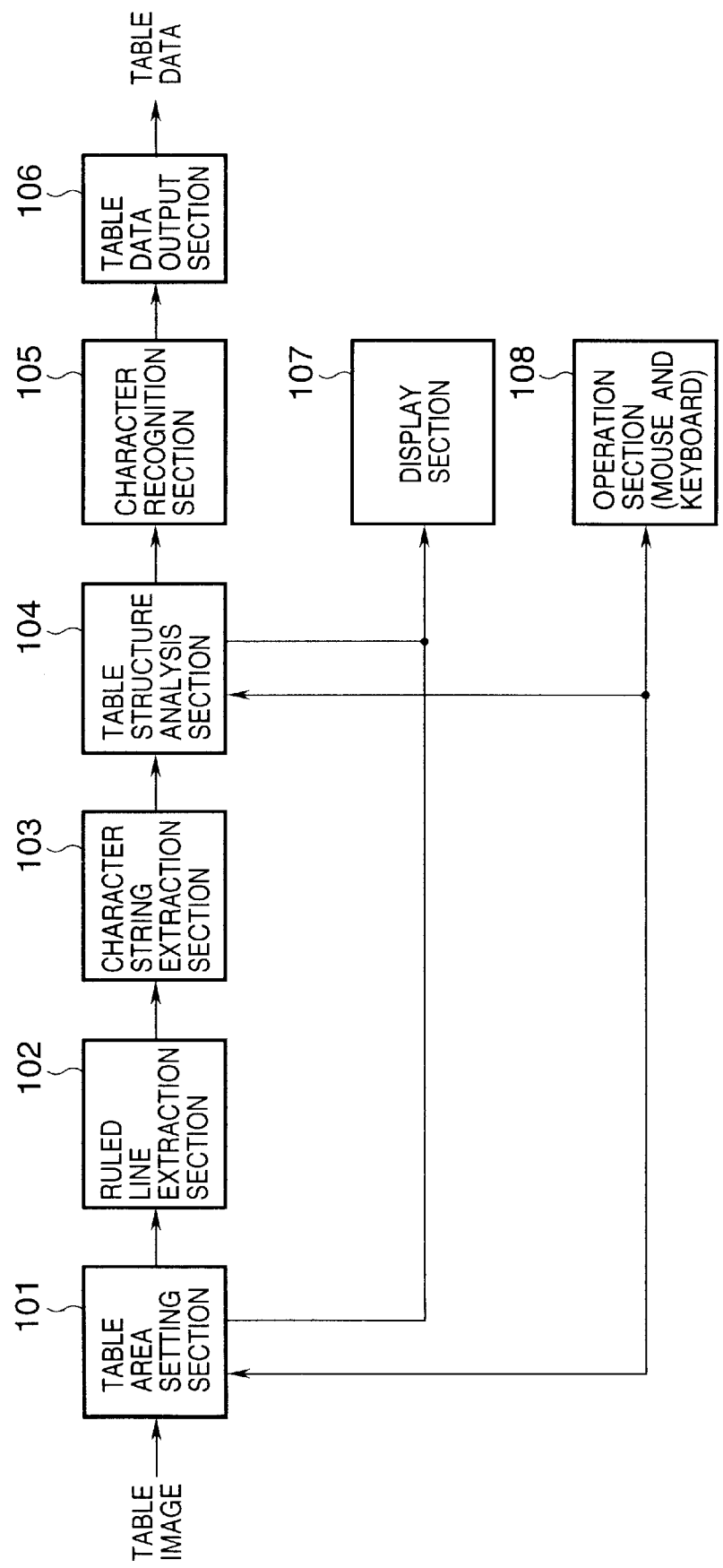
FIG. 2 is a block diagram showing the functional arrangement of the table recognition apparatus of the embodiment.

FIG. 2 is a block diagram showing the functional arrangement of the table recognition apparatus of this embodiment. Referring to FIG. 2, a table area setting section 101 sets the table area of an image. A ruled line extraction section 102 extracts ruled lines from a table image. A character string extraction section 103 extracts the rectangle of a character string from a table image. A table structure analysis section 104 analyzes the table structure from the rectangles and ruled lines of a table. A character recognition section 105 recognizes characters. A table data output section 106 outputs the analyzed table structure and character recognition result as table data. A display section 107 displays information of a table image and table structure analysis result on the display 15. An operation section 108 processes an operation input designated by the user through the input device 16 such as a keyboard or a mouse to set a table area or edit the cells of a table.

Figure 3:
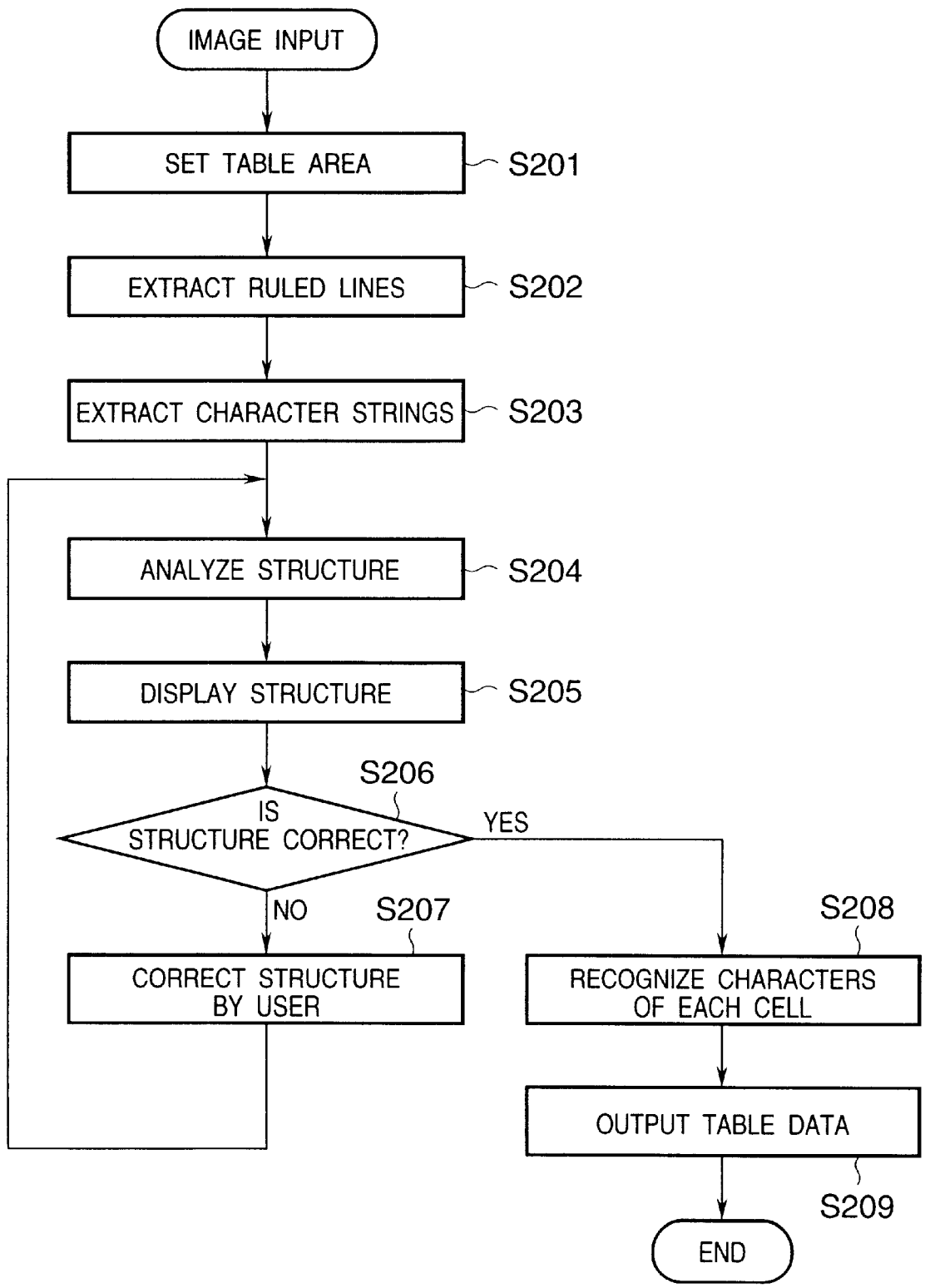
FIG. 3 is a flow chart for explaining table recognition processing of the embodiment.

The functions shown in FIG. 2 are constituted when the CPU 11 executes the control program for realizing control shown in the flow chart of FIG. 3 (to be described later), which is loaded from the external storage device 14 into the RAM 13.

The operation of the table recognition apparatus of this embodiment will be described next with reference to FIG. 3. FIG. 3 is a flow chart for explaining table recognition processing of the embodiment.

In step S201, the table area setting section 101 sets a table area in an input image. For example, a table portion is extracted from a document image read by the scanner 18. This example assumes that the user designates a rectangle surrounding a table using a mouse on a document image displayed on the display to set a table area. A table area may be automatically set using an area division result obtained using a well-known automatic document area division technique. For an image having only a table, the entire image is set as a table area.

In step S202, the ruled line extraction section 102 extracts the ruled lines of the table from the set table area. A table ruled line can be obtained by detecting continuous black pixels on the image. The technique for extracting ruled lines is well known, and a detailed description thereof will be omitted.

In step S203, the character string extraction section 103 extracts character strings in the table. More specifically, the character string extraction section 103 extracts the coordinates of each rectangle surrounding a character string. This is done by detecting the circumscribed rectangle of connected black pixels as a character or part of a character and regarding, as a character string, a rectangle obtained by connecting rectangles close to each other. Generally, characters forming a character string forming a cell are often adjacent in the horizontal direction. For this reason, rectangles arranged in the horizontal direction within a distance corresponding to the estimated average character height of one character are integrated to detect the rectangle of one character string. The character height is used due to the following reasons. Although the "character width" largely changes depending on the character type, the "character height" is relatively stable. In addition, although adjacent characters readily come into contact with each other, character lines rarely come into contact, and the "character height" can be stably extracted as a reference value.

FIG. 4 is a view showing an example of a table image. FIG. 5 is a view showing a character string extraction result corresponding to the table image shown in FIG. 4. When the character string extraction section 103 extracts character strings from the table image shown in FIG. 4, rectangle areas are obtained, as shown in FIG. 5. Subsequent processing is performed regarding the set of rectangles of character strings as the initial value of the set of the rectangles, though extracted character strings do not always correspond to table cells as meaningful sets in a one-to-one correspondence.

In step S204, the table structure analysis section 104 analyzes the table structure using the set of the ruled lines and cells obtained by the above-described processing. In the table structure analysis, the number of cells, i.e., rows and columns of the table, and the positions of the cells on the matrix (the row and column having each cell) are determined.

The method of obtaining rows and columns in this embodiment will be described below. A table is divided into columns in the vertical direction and rows in the horizontal direction by ruled lines or spaces between cells. That is, to obtain the rows and columns of a table equals to obtain the set of positions of boundaries such as ruled lines or spaces between cells. The procedure of obtaining boundaries in a table will be described below with reference to FIGS. 6 and 7.

Figures 6, 7, 8:
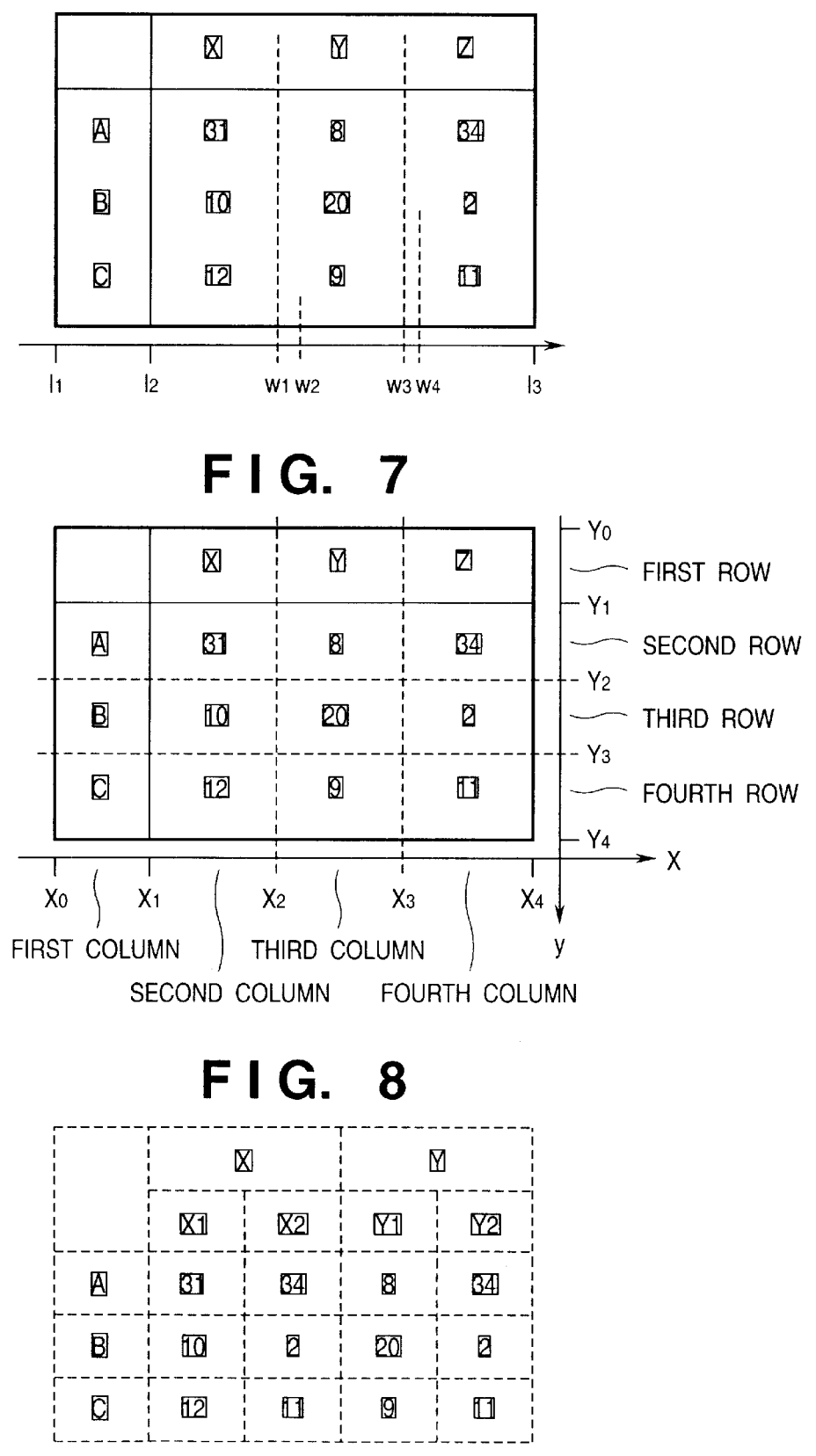

The procedure of obtaining a set X of column boundaries will be described first. FIG. 6 is a view showing a state wherein column boundary position candidates are extracted in association with the character string extraction result shown in FIG. 5. To obtain column boundaries, the x-coordinates of the positions of vertical ruled lines in the table are extracted, and L=l1, . . . , lj is set. Next, the median between the ends of two cell rectangles adjacent in the horizontal direction (to be referred to as an intercell position hereinafter) is detected as a boundary, and the set of the x-coordinates of boundaries between adjacent two of all rectangles is set as W=w1, . . . , wk. Referring to FIG. 6, three vertical ruled line positions (11, 12, and 13) and four intercell positions (w1 to w4) are detected. These positions are candidates of columns boundaries.

A set obtained by sorting the sum of sets L and W is B. In the set B, coordinate values adjacent and close to each other (i.e., coordinates separated by a predetermined value or less) are interpolated into one intermediate coordinate. The coordinates of the ruled lines are not moved. More specifically, when coordinates lp and wq are interpolated, the coordinate value lp is always left. The ruled lines are not interpolated.

The set of boundary coordinates obtained by the above procedure is regarded as the set X of column boundaries, X=X0, . . . , Xm. In the same way, a set Y of row boundaries, Y=Y0, . . . , Yn, is obtained from horizontal ruled lines and boundaries of rectangles adjacent in the vertical direction. Since the columns or rows of the table are present between the column or row boundaries, the number of columns of the table is m, and the number of rows is n. FIG. 7 is a view showing the detection result of column and row boundaries. The table column between the column boundaries Xi and X(i+1) is the "(i+1)th column". The table row between the row boundaries Yj and Y(j+1) is the "(j+1)th row".

The range of each cell extracted in FIG. 5 on the rows and columns of the table, which is determined as shown in FIG. 7, is obtained by the following method.

Assume that the four apexes of a rectangle are (x0,y0), (x1,y0), (x1,y1), and (x0,y1) (this rectangle will be referred to as a rectangle of (x0,y0) to (x1,y1). Of four points formed by the coordinate values of the row and column boundaries, four minimum points surrounding the cell are (Xi,Yj) to (Xk,Yl)

In this case, i<k, and j<l. The position of the cell on the matrix is represented by (i+1,j+1) to (k, l) The position (i+1,j+1) to (k, l) of the cell on the matrix means a position between the (j+1)th row and the l th row of the table and between the (i+1) th column and the kth column of the table.

The result obtained by table structure analysis in step S204 is stored in the RAM 13 as table data representing the numbers of row and column cells and table data by making the cell identification number, the position data of the cell, and extracted characters contained in the cell correspond to each other in units of cells.

When the table structure is analyzed in the above manner, the display section 107 displays the structure analysis result on the display 15. On the display 15, the cell rectangles and the row and columns boundaries, which are extracted by the above processing, are superposed on the original table image.

When a cell across a plurality of rows or columns is present, the boundary lines in the cell are not displayed. More specifically, a vertical line having, at its ends, boundary coordinates (Xp,Yq) and (Xp,Yr) is represented by Vpq-pr, and a horizontal line having, at its ends, boundary coordinates (Xp,Yq) and (Xs,Yq) is represented by Hpq-sq. When the cell is represented by the position (i+1,j+1) to (k, l) on the table matrix, line segments corresponding to Vpj-pl (p=i+1, . . . , k−1)

Hiq-kq (q=j+1, . . . , l−1)

are not drawn. In this case, i+1<k, and j+1<l.

FIG. 8 is a view showing an example of a boundary line display result based on the above algorithm. As shown in FIG. 8, even when a cell is present across a boundary line, the range of the cell on the matrix is indicated by a frame surrounded by boundaries, the table structure can be easily grasped.

In this embodiment, as the initial value of a "cell rectangle", the "rectangle of a character string" extracted in step S203 is used. In the following description, a minimum frame obtained by surrounding a "cell rectangle" by row and column boundary lines will be referred to as a "cell frame".

A cell of a table is a meaningful set of characters forming an element of the table. Since the rectangles of character strings extracted in step S203 are merely the sets of adjacent characters, the sets of characters do not always correspond to cells in a one-to-one correspondence. Steps S206 and S207 provide a means for correcting it to the user.

In step S206, the user determines whether the table structure indicated by the cells and boundary lines displayed on the display matches the table structure of his/her intention. For example, when the structure of a table as shown in FIG. 9 is accurately analyzed, the table structure is displayed on the display as shown in FIG. 10. FIG. 11 is a view showing a display example when the table structure analysis result has errors due to some reason, e.g., because rectangles regarded as cells are not correct.

If the user determines that the table structure of the analysis result does not match the table structure of the user's intention, the user can manually correct the cells in step S207. Correction is performed for a cell rectangle superposed on the table image, on the display window using a mouse or a keyboard. When the mouse is clicked on a rectangle frame, the rectangle is selected. The selected rectangle can be deformed, moved, or deleted. A new rectangle frame can also be formed. The table data stored in the RAM 13 is updated in accordance with correction. Three representative operations of correcting the table structure will be described below.

① Merging Cells

This correction is performed when two or more character strings which should form one cell are detected as different cells, as shown in FIG. 12A. An operation of merging the cells into one cell by mouse operation is provided to the user. For example, the mouse is clicked on separated cell rectangles (1211 and 1212) to select the plurality of cell rectangles. When a key for instructing merging is depressed, one rectangle (1213) including the two selected rectangles is calculated and generated. The two original rectangle data are updated to the new rectangle data (1213) (FIG. 12B). In accordance with generation of the new rectangle (1213), a cell frame (1201) and a cell frame (1202) are merged to generate a new cell frame (1203). The merge instruction can be realized not by the key dedicated to merge instruction but by an item of a pull-down menu by mouse operation.

② Splitting Cells

This correction is performed when two or more cells which should be split are merged into one cell, as shown in FIG. 13A. The user clicks a cell (1311) with the mouse to select the cell. After this, the user deforms the cell rectangle in accordance with the form and position of the correct cell rectangle (1312), and then, forms a new cell rectangle (1313) to form a new cell (FIG. 13B). On the basis of cell rectangle correction and new cell rectangle generation, the positions of a cell frame (1302) after correction and a cell frame (1303) after new cell rectangle generation are calculated.

③ Correction of Cell Range

Figure 14A:
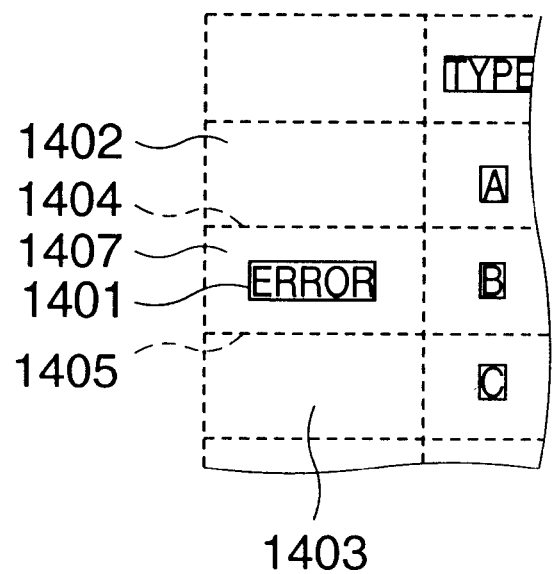
FIGS. 14A and 14B are views for explaining change in cell range as still another example of table structure correction.
Figure 14B:
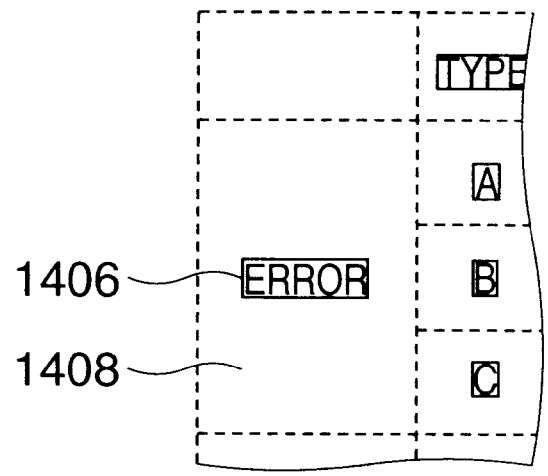

This correction is performed when the position of a cell rectangle in the table matrix is not correct although correction between the cell and character string is correct, as shown in FIG. 14A. The user clicks the mouse on a cell rectangle (1401) to select the cell rectangle. After this, the user deforms the cell rectangle and extends the cell frame to the original cell range (1406) across currently drawn boundary lines (1404 and 1405), thereby correcting the size of the cell rectangle (1401). A cell frame (1407) is corrected to a cell frame (1408) on the basis of a cell rectangle (1406) (FIG. 14B). In this embodiment, the cell rectangle (1401) can be extended by selecting the boundary line (e.g., 1404) only when any other cell rectangle is not present in a frame (1402) at the extension designation. Hence, when another cell rectangle is present in the frame at the extension designation, the cell rectangle can be extended to only the boundary line. Even when another cell rectangle is present in the frame of the extension designation, the cells may be merged by extending the cell rectangle while incorporating the another cell rectangle.

Every procedures of cell rectangle update operation, i.e., every time the user drags and releases the mouse to operate a cell rectangle or delete a cell rectangle, the flow returns to step S204 to analyze the table structure having the updated cell and update the cell order and the like. In step S205, the structure as the analysis result is immediately displayed. The structure may be partially displayed at only the corrected portion. For this reason, the user can immediately know the analysis result of the table structure with the cell rectangle corrected by himself/herself.

After the table structure is corrected in the above way, when the user determines that the table structure displayed on the display matches the structure of the user's intention, the table structure is determined by an operation input. The flow shifts to data output processing in steps S208 and S209.

In step S208, the character recognition section 105 executes a well-known character recognition technique for the characters in the table image, which correspond to the cells of the table, and converts the characters into character codes. In step S209, table format data is generated from the table structure determined by the above-described processing and the character codes of the cells of the table and output. FIG. 15 is a view showing an output example of HTML format data corresponding to the table shown in FIG. 9 as an example of table format data.

As described above, according to this embodiment, in the table recognition apparatus for analyzing a table structure and outputting table data, the user can efficiently correct a table which is difficult or impossible to analyze by automatic processing, and table data according to the intention of the user can be easily obtained.

Other Embodiments

In the above-described embodiment, the rectangle of a character string obtained by extracting a character string from a table image is displayed on the display as the initial value of the rectangle, and the user corrects the table structure by deforming, moving, or deleting displayed cell rectangles. However, the correction method by the user is not limited to this. As an deformation of the method, for example, a cell rectangle for designating a cell may be displayed on the display independently of the character string rectangle obtained by character string extraction, and the user may correct this.

Figure 16:
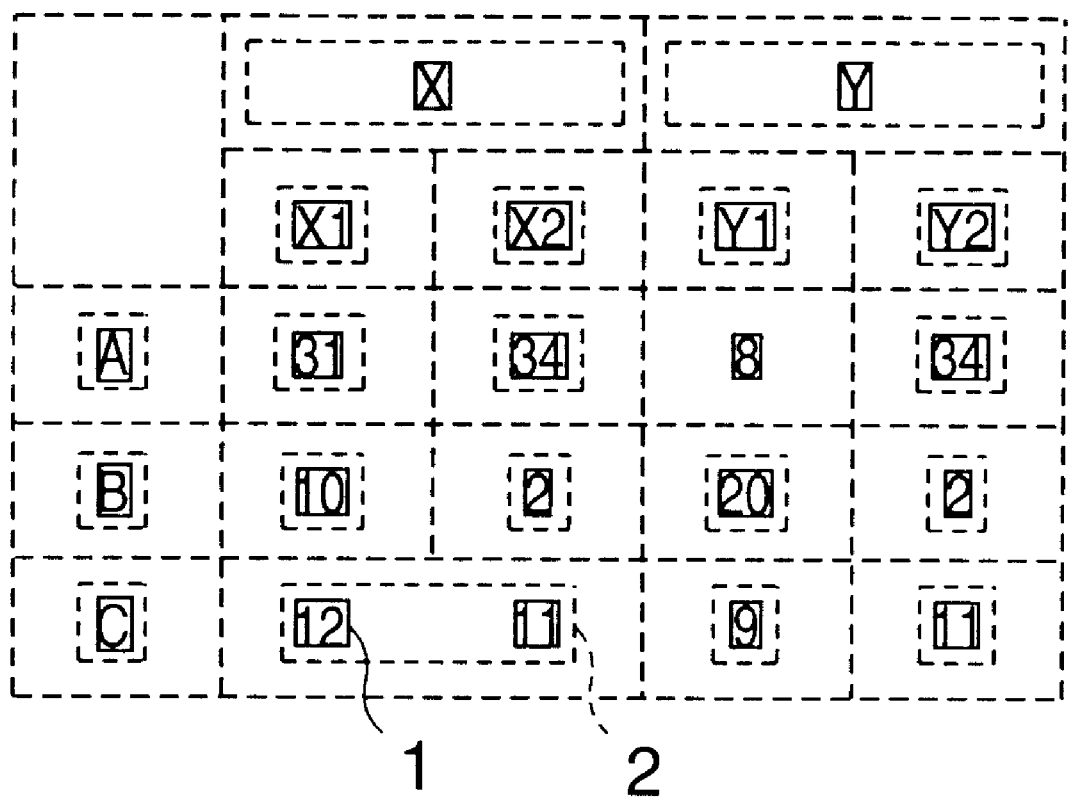
FIG. 16 is a view for explaining table structure correction according to another embodiment.

FIG. 16 is a view for explaining table structure correction according to another embodiment. Both character string rectangles and cell rectangle are displayed on the display. A rectangle 1 indicated by a bold line is a character string rectangle. A rectangle 2 indicated by a dotted line is a cell rectangle. Each rectangle can be deformed, moved, or deleted by mouse operation. With this method, when a cell is to be deformed as shown in FIGS. 14A and 14B, as described in the first embodiment, extension of the cell rectangle (rectangle indicated by a dotted line in FIG. 16) suffices. The character string rectangle to be subjected to character recognition keeps its shape. For this reason, even when the extended portion contains noise, it does not influence on character recognition.

As described above, according to this embodiment, the user can efficiently correct the table structure and easily obtain table data of his/her intention. Additionally, the influence of deformation of a cell rectangle on character recognition can be reduced.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, "cells" in the table structure obtained as a result of automatic analysis can be easily corrected, so the table structure can be efficiently corrected. As a consequence, the user can easily obtain table data of his/her intention.

According to the present invention, correction can be more efficiently performed by displaying a change in table structure based on correction by the user in real time.

As many apparently widely different embodiments of the present invention can be made without departing from the spirit and scope thereof, it is to be understood that the invention is not limited to the specific embodiments thereof except as defined in the appended claims.

What is claimed is:

1. A table recognition apparatus comprising:

analysis means for analyzing an area and position of each cell in a table based on a layout state of ruled lines and character strings contained in an image of the table to obtain a table structure;

table structure display means for displaying the table structure obtained by said analysis means to indicate the area of every cell and which cell each character string belongs to;

instruction means which receives a correction instruction input by a user, wherein the correction instruction is for instructing correction of an area of a cell or which cell a character string belongs to in the table structure displayed by said display means;

correction means for correcting the area and position of the cell based on the correction instruction received by said instruction means to obtain a corrected table structure; and generation means for recognizing characters in each cell of the corrected table structure and generating table format data based on a recognition result and the corrected table structure.

2. The apparatus according to claim 1, further comprising correction display means for displaying the corrected table structure obtained by said correction means.

3. The apparatus according to claim 1, wherein said analysis means comprises:

ruled line extraction means for extracting the ruled lines contained in the image of the table; and cell area extraction means for detecting a rectangular area surrounding characters contained in the image of the table and merging rectangular regions separated by a distance having not more than a predetermined value to extract rectangular areas of cells, wherein the table structure is obtained based on the ruled lines and the rectangular areas of the cells, which are extracted by said ruled line extraction means and said cell area extraction means.

4. The apparatus according to claim 3, wherein said analysis means determines boundaries of columns and rows of the table based on the ruled lines extracted by said ruled line extraction means and space portions between the rectangular areas of the cells extracted by said cell area extraction means.

5. The apparatus according to claim 4, wherein said table structure display means superposes, on the image of the table, boundary lines representing the rectangular areas of the cells and the boundaries obtained by said analysis means.

6. The apparatus according to claim 4, wherein said table structure display means displays character string rectangles, cell area rectangles, and boundary lines between the cells of the image of the table.

7. A table recognition method comprising:

analyzing an area and position of each cell in a table based on a layout state of ruled lines and character strings contained in an image of the table to obtain a table structure;

displaying the table structure obtained in said analyzing step to indicate an area of every cell and which cell each character string belongs to;

receiving a correction instruction input by a user, wherein the correction instruction is for instructing correction of an area of a cell or which cell a character string belongs to in the table structure displayed in said display step;

correcting the area and position of the cell based on the correction instruction received in said receiving step to obtain a corrected table structure; and recognizing characters in each cell of the corrected table structure and generating table format data based on a recognition result and the corrected table structure.

8. The method according to claim 7, further comprising displaying the corrected table structure obtained in said correction step.

9. The method according to claim 7, wherein said analyzing step comprises:

extracting the ruled lines contained in the image of the table; and detecting a rectangular area surrounding characters contained in the image of the table and merging rectangular regions separated by a distance having not more than a predetermined value to extract rectangular areas of cells, wherein the table structure is obtained based on the ruled lines and the rectangular areas of the cells, which are extracted in said ruled line extracting step and said cell area extracting step.

10. The method according to claim 9, wherein said analyzing step comprises determining boundaries of columns and rows of the table based on the ruled lines extracted in said ruled line extracting step and space portions between the rectangular areas of the cells enacted in said cell area extracting step.

11. The method according to claim 10, wherein said table structure displaying step comprises superposing, on the image of the table, boundary lines representing the rectangular areas of the cells and the boundaries obtained in said analyzing step.

12. The method according to claim 10, wherein said table structure displaying step comprises displaying character string rectangles, cell area rectangles, and boundary lines between the cells of the image of the table.

13. A storage medium storing a control program for generating table format data on the basis of image information of a table, the control program comprising:

code for an analysis step of analyzing an area and position of each cell in the table based on a layout state of ruled lines and character strings contained in an image of the table to obtain a table structure;

code for a table structure display step of displaying the table structure obtained in the analysis step to indicate the area of every cell and which cell each character string belongs to;

code for an instruction step of receiving a correction instruction input by a user, wherein the correction instruction is for instructing correction of an area of a cell or which cell a character string belongs to in the table structure displayed in the display step;

code for a correction step of correcting the area and position of the cell based on the correction instruction received in the instruction step to obtain a corrected table structure; and code for a generation step of recognizing characters in each cell of the corrected table structure and generating the table format data based on a recognition result and the corrected table structure.

14. A table recognition apparatus comprising:

an analysis unit for analyzing an area and position of each cell in a table based on a layout state of ruled lines and character strings contained in an image of the table to obtain a table structure;

a table structure display unit for displaying the table structure obtained by said analysis unit to indicate the area of every cell and which cell each character string belongs to;

an instruction unit which receives a correction instruction input by a user, wherein the correction instruction is for instructing correction of an area of a cell or which cell a character string belongs to in the table structure displayed by said display unit;

a correction unit for correcting the area and position of the cell based on the correction instruction received by said instruction unit to obtain a corrected table structure; and a generation unit for recognizing characters in each cell of the corrected table structure and generating table format data based on a recognition result and the corrected table structure.

* * * * *